United States Patent
Kuwata et al.

(10) Patent No.: US 7,584,089 B2
(45) Date of Patent: Sep. 1, 2009

(54) METHOD OF ENCODING AND DECODING FOR MULTI-LANGUAGE APPLICATIONS

(75) Inventors: Katie Kuwata, Oceanside, CA (US); William Su, Corona, CA (US); Truc Nguyen, San Diego, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 957 days.

(21) Appl. No.: 10/385,417

(22) Filed: Mar. 10, 2003

(65) Prior Publication Data

US 2003/0182128 A1   Sep. 25, 2003

Related U.S. Application Data

(60) Provisional application No. 60/362,820, filed on Mar. 8, 2002.

(51) Int. Cl.
*G06F 17/28* (2006.01)
(52) U.S. Cl. .................... 704/7; 704/8; 704/9; 704/257
(58) Field of Classification Search .................... 704/8, 704/1
See application file for complete search history.

(56) References Cited

U.S. PATENT DOCUMENTS

| 5,519,443 | A | * | 5/1996 | Salomon et al. ............. 348/467 |
| 5,758,314 | A | * | 5/1998 | McKenna ...................... 704/8 |
| 5,787,452 | A |   | 7/1998 | McKenna |
| 6,061,057 | A | * | 5/2000 | Knowlton et al. ........... 715/744 |
| 6,247,048 | B1 |  | 6/2001 | Greer et al. |
| 6,314,469 | B1 | * | 11/2001 | Tan et al. ........................ 704/8 |
| 6,434,574 | B1 | * | 8/2002 | Day et al. .................... 707/203 |
| 2001/0020225 | A1 |  | 9/2001 | Zerber |
| 2001/0025320 | A1 |  | 9/2001 | Seng et al. |
| 2001/0037337 | A1 | * | 11/2001 | Maier et al. ................. 707/101 |
| 2001/0047429 | A1 |  | 11/2001 | Seng et al. |
| 2002/0059448 | A1 | * | 5/2002 | Honeywood ................ 709/238 |
| 2002/0120689 | A1 | * | 8/2002 | Kang et al. ................. 709/206 |
| 2004/0015584 | A1 | * | 1/2004 | Cartmell et al. ............. 709/225 |
| 2004/0044791 | A1 | * | 3/2004 | Pouzzner .................... 709/245 |
| 2004/0139086 | A1 | * | 7/2004 | Hasenau ..................... 707/100 |

OTHER PUBLICATIONS

"How i-DNS Works"; Mar. 26, 2002.
Multilingual Domain Names: Joint ITU/WIPO Symposium; ITU Briefing Paper: Technology and Policy Aspects, Dec. 6, 2001.
The International Character Set Conundrum; Kano, Nadine; Freytag, Asmus; Microsoft Systems Journal, v9, n11, p. 55 (12): Nov. 1994.

* cited by examiner

*Primary Examiner*—Richemond Dorvil
*Assistant Examiner*—Leonard Saint Cyr
(74) *Attorney, Agent, or Firm*—Tucker Ellis & West LLP

(57) ABSTRACT

An architecture for universal data communication between a network client and a web server. A web server receives a character string from the network client for storing. The web server encodes and then stores the string. Any character that is not a 7 bit ASCII character is encoded by encapsulating it with an escape code, the escape code comprised of an illegal character. Upon a request to retrieve the encoded string, the web server decodes and converts to UTF8 the encoded character string. When a client or browser requests the folder or document containing the encoded string, the string is properly displayed in the client's or browser's native language.

13 Claims, 2 Drawing Sheets

METHOD OF ENCODING AND DECODING FOR MULTI-LANGUAGE APPLICATIONS

This application claims the benefit of U.S. Provisional Application No. 60/362,820 filed Mar. 8, 2002.

BACKGROUND OF THE INVENTION

This invention is related to browser-based character encoding schemes. Web-based applications are accessed by client users from different brands of web browsers, e.g., Internet Explorer®, Netscape Navigator®, etc., different numbered versions thereof, e.g., Internet Explorer Version 5 and Version 6, Netscape Versions 4 and 5, etc., and different native language versions of the browsers, e.g., Netscape 4.7 English Version, Japanese Version, French Version, etc. Additionally, there are different choices of web servers, e.g., Apache®, Microsoft IIS®, etc., that run on many different operating systems, e.g., Windows NT®, Linux, Windows NT Japanese version, Windows NT French version, etc.

In a typical client/web server scenario, communication therebetween includes the client user sending requests and data from the client web browser to the application on the web server. The web-based application responds to the client requests and sends back data to the client web browser and for presentation to the user. The communication that occurs to facilitate this exchange of information utilizes one or more encoding/decoding standards that are supposed to work transparently to the user so that the information presented to the user is recognizable. Conventionally, however, this is not always the case.

There are many different character-encoding schemes used by client web browsers, operating systems, and web servers to accommodate the many different alphabets and languages becoming more pervasive on the Internet. Incompatibilities in encoding/decoding schemes produces unrecognizable character strings (i.e., "gibberish" data) when the client browser and the web server do not use the same encoding scheme.

The only compatible character set for all operating systems is 7-bit ASCII; however, this encoding scheme does not have a sufficient number of code characters to describe a complete character set utilized in many foreign languages.

When a user submits, for example, Japanese characters for a folder name in a Japanese encoding mode in a conventional process for creating a folder on a web server by a client, the client web browser translates the Japanese characters in its own encoding scheme (if charset=ISO-2022-JP, it will be JIS—multi-byte 8-bit high character), and the request is submitted to the web server. If the web server uses an English OS (operating system), the web server will not understand the JIS character set as a folder name, and thus the folder will not be created. As a result, the user cannot create a folder in his native language.

When the user submits Japanese characters in the English encoding mode, the Japanese characters are translated in its own encoding scheme (most likely in UTF-8) and the client web browser submits the request to the web server. If the web server uses the English OS, the web server does understand the characters and creates the requested folder in UTF-8. However, since UTF-8 uses the special characters & and #, which are special characters for the web and have a special meaning, the requested folder name is displayed in characters unrecognizable by the viewer when ultimately processed by the web server and displayed. Thus a user still cannot use a folder name in his native language.

When a first user submits Japanese characters in the Japanese encoding mode in a conventional process for storing the data inside a text file on the web server, the client web browser translates the Japanese characters using its own encoding scheme (if charset=ISO-2022-JP, it will be JIS—multi-byte 8-bit high character) and submits the encoded request to the web server. If the web server uses an English OS, the web server receives the data encoded in JIS, and stores the data in JIS to a text file.

When a second user requests the data inside the text file, and the second user uses the same type of web browser and has the same browser settings (i.e., JIS), the second user is able to recognize the characters as being presented correctly, since the browser is capable of decoding the JIS encoded text. However, if the browser of the second user utilizes a different encoding scheme (i.e., not JIS), the second user cannot view the data correctly, since his or her browser does not understand JIS encoding scheme. Furthermore, if the data is stored in UTF-8, the same problem exists that is described hereinabove with respect to folder names, since the special characters "&" and "#" have a special meaning for the web use.

SUMMARY OF THE INVENTION

In view of the aforementioned needs, the present invention contemplates a method, apparatus, and system for encoding and decoding characters.

The encoding method comprises determining whether a character is a standard seven bit ASCII character. If the character is not a standard seven bit ASCII character, then it is converted to a plurality of seven bit ASCII characters and encapsulated by a pre-appended digital header or escape code and an appended digital appendix or escape code. The pre-appended and appended escape code may be the same. Furthermore, the pre-appended escape code and the appended escape code are comprised of at least one illegal character, which is typically pre-selected.

The decoding method comprises determining whether a character is a seven bit ASCII character or comprises an escape code. If the character contains an escape code, either as a header or an appendix, then it is converted to a UTF8 character. Usually when converting a non-seven bit character to a UTF8 character, the steps comprise removing the escape codes, pre-appending an ampersand symbol and a pound symbol to the character and appending a semi-colon symbol to the character.

The encoding and decoding methods may be implemented via hardware, software or a combination thereof.

In the preferred embodiment, it is contemplated that the present invention is implemented on a web server.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Figure 1:
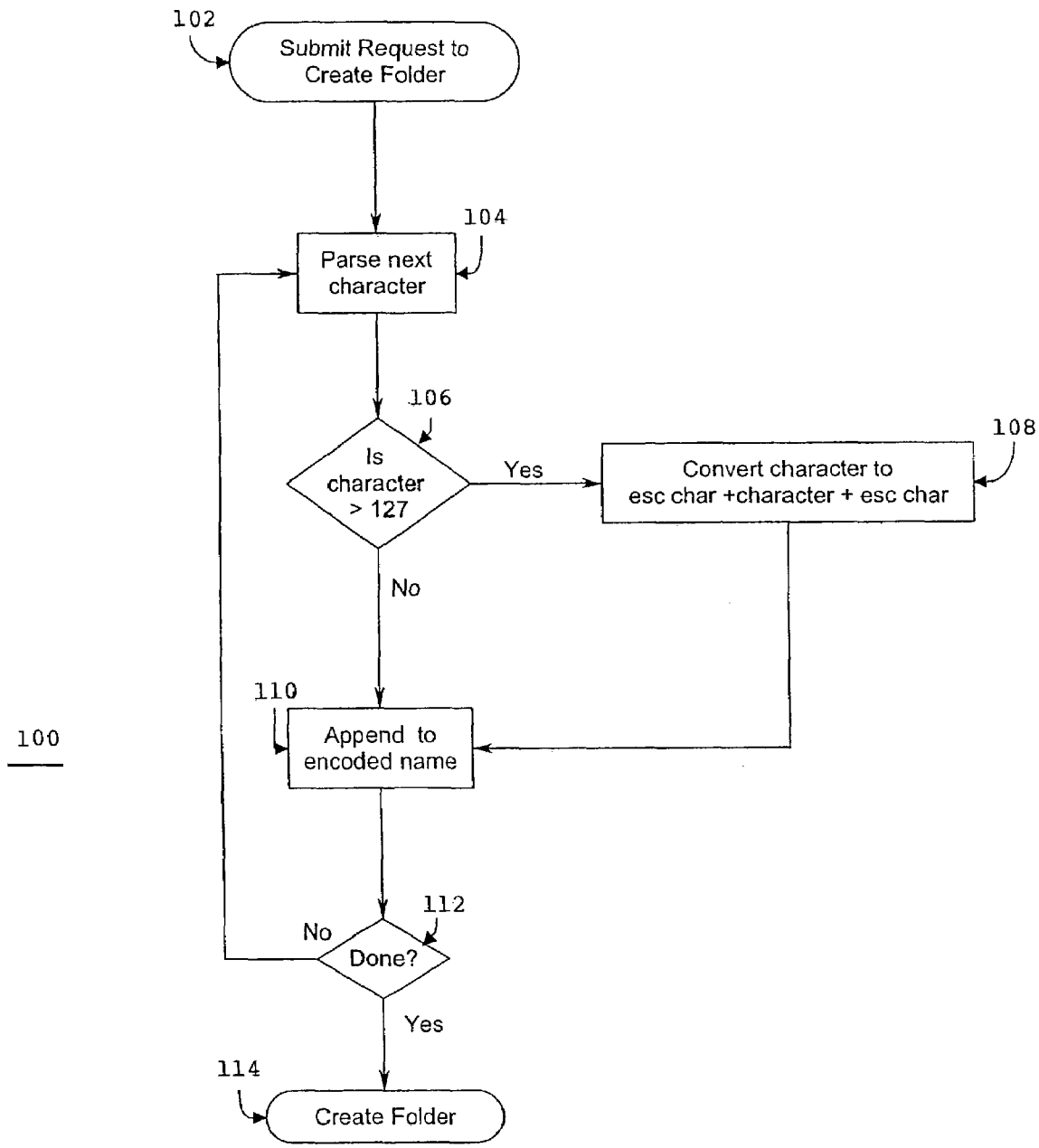
FIG. 1; is a block diagram showing the steps for encoding characters.

The disclosed invention solves the encoding/decoding problem by encoding any 8-bit high character into a pair of 7-bit ASCII characters on the server side (which 7-bit ASCII characters are universally recognized by any operating system (OS), file system, and web server). The name may be stored inside an XML file to allow the client user to use more characters not normally encoded (e.g., asterisk (*) (represented by 0×2a) is not normally encoded). This allows a user to see any mixed-language characters correctly (e.g., English, Japanese, French, Spanish, etc.), insofar as the client web browser has the proper font set. This works under any operating system, file system, web server with any language (server side), and any type of browser that supports UTF-8 on any client-side OS. Characters larger than 8 bits are encoded into a plurality of 7-bit ASCII characters.

The present invention also alleviates the problems associated with passing string data from JAVA to native codes in a client OS like Linux, which does not use UTF-16 as its native code. The document or folder name may be stored inside an XML file after encoding, which allows for the use of some special characters (e.g., space and #) that a web server does not normally allow, and some special characters which a native client OS does not allow (e.g., *, ?, and |).

An "escape" code is selected by using one or more illegal characters that the native OS can understand as a folder name. For example, choose a double semi-colon (;;), which is the equivalent of ASCII $3B_{hex}$ $3B_{hex}$, as an escape code. This means that the client OS does not allow a client user to create a folder name containing the double semi-colon escape code (;;). When a user submits a request to the web server to create folder name, e.g., "fefXfg_DSE", the web server OS receives the request in the form of a character string having both 7-bit and 8-bit characters. The 8-bit characters are encoded using the escape code doublet (;;) to generate 12486, 12473, 12488, and the 7-bit characters (_DSE) are converted to the equivalent 7-bit ASCII representation of 95(for the underscore symbol_), 68(for the letter D), 83(for the letter S), 69(for the letter E). Again, if the character has a value greater than seven bits, the web server browser encodes (or encapsulates) the character into the escape code doublet (;;)+(character code for the)+ escape code doublet (;;). Note that the escape code need not be a doublet, but could also be a single character, so long as the character is relatively unique in that it can not be misinterpreted as another character. It should also be noted that while an 8 bit character is encoded as two 7 bit ASCII characters, characters containing a larger number of bits may be encoded by using a larger number of 7 bit ASCII characters. By using a beginning an ending escape code, the number of 7 bit ASCII characters encapsulated by the escape codes can be varied.

The string is then converted to ";;12486;;;;12473;;;;12488;; _DSE". The native web server OS file system then creates the folder name as ";;12486;;;; 12473;;;;12488;;_DSE" and stores this character string in an XML file.

When a user requests to view the folder name of the web server from the client browser, the web server system retrieves the character string from the XML file, detects the first character of the folder name as an escape code (;;), and it converts the character from ";;12486;;" to "テ" (in UTF-8). The remaining characters from the XML file are string decoded to "テスト_DSE", and sent to the client web browser in Unicode to be presented to the user as the folder name as "fefXfg_DSE".

The method is unique because the way it encodes and decodes allows a user to see any mixed-language characters (English, Japanese, French, Spanish, etc.) correctly, as long as the client web browser has the font set. This method also works under any operating system, file system, and web server, with any language and with any type of browser. Referring now to FIG. 1, there is illustrated a flow chart of the process 300 for the server processing received client information, in accordance with a disclosed embodiment. Generally, a client user sends a string of characters to the server via the client browser in a foreign language font. The server receives the character string and encodes it, before storing or using the string. In the example given in FIG. 3 the server is creating a folder with the name sent by the client, in the client's native language. As those skilled in the art can readily appreciate, this process can also be used for creating file names, or for storing characters in a file.

The process 100 begins at step 102 when the server receives a request to create a folder. The server would receive a folder name, for example "fefXfg_DSE", with the request, normally in the form of a string. The server then parses the next, or in this case, the first character, of the folder name a character as shown in step 104. As shown in step 106, the server determines whether the character is seven bit ASCII or a higher value. If the character is not a seven bit ASCII character, then processing proceeds to step 108. At step 108 the character is then encapsulated by escape codes. An escape code is pre-appended to the character, and another escape code is appended to the character. The pre-appended and appended escape codes may be the same code, or a different code. At step 110 the character is appended to the encoded name. At step 112 it is determined whether there are more characters to process. If there are more characters, the process returns to step 104 wherein the next character is processed. If, at step 112, there are no more characters to process, then as shown at step 114 the folder is created using the encoded string, which in this example would be ";;12486;;;;12473;;;; 12488;;_DSE".

Figure 2:
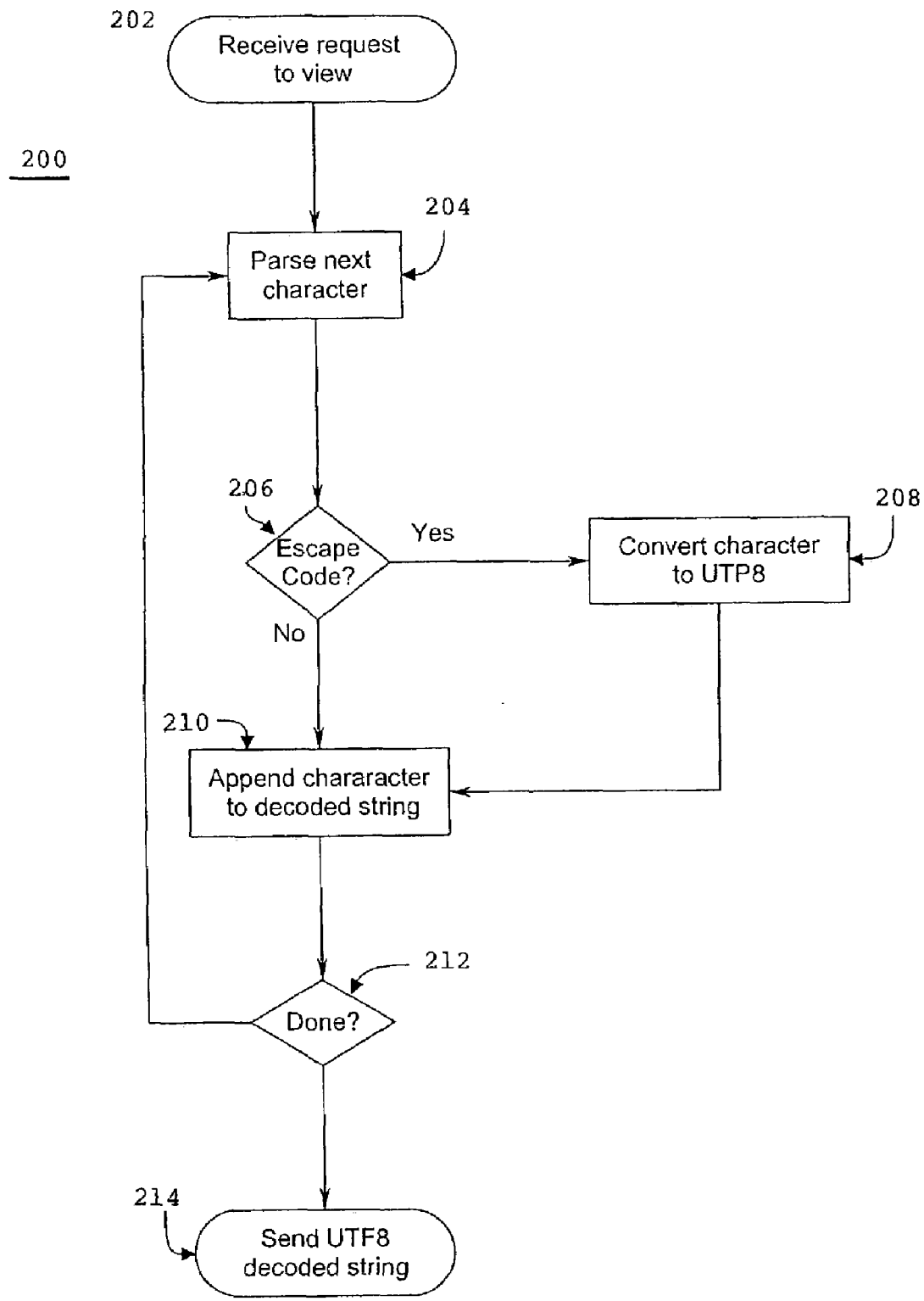
FIG. 2 is a block diagram showing the steps for decoding characters which have been encoded by the method of the present invention.

Referring now to FIG. 2, there is shown a process 200 used by the server when a user requests to view the folder name of the web server from a client browser. The process begins at step 202 when the web server receives the request to view the folder, or folder name. In this example, the folder name is encoded as ";;12486;;;;12473;;;;12488;;_DSE". As shown instep 204, the process parses the next character, or in the case of the process just beginning the first character, of the encoded folder name. At step 206 it is determined if the character contains an escape code. In the present example, the first character, ;;12486;;" has an escape code. When an escape code is encountered, processing goes to step 208 wherein the character is converted to UTF-8, which in this example would mean that the first character ;;12486;; is converted to テ. At step 210 the decoded character is appended to the decoded string. At step 212 it is determined whether there are more characters to process. If there is another character to process, then the process 200 returns to step 204 wherein the next character is parsed and processed accordingly. If at step 212 there are no more characters to process, then the decoded string is sent to the client at step 214. In this example, the decoded string, UTF-8 string "テスト_DSE" would be sent to the client. The client web browser would present the folder name as "fefXfg_DSE" as long as it is using the proper font.

The present invention allows a user to see any mixed-language characters (English, Japanese, French, Spanish, etc.) correctly, as long as the client web browser has the font set. This method also works under any operating system, file system, and web server, with any language and with any type of browser.

Following are pseudo codes that describe the encoding and decoding functions.

```
encodeSpecialChar( ) {    // Getting a request from the browser
    var name = window.document.forms[0].elements["NewDoc"].value;
    var len = name.length;
    var i;
for (i = 0;i < len;i++) {     // Receive the each character in UTF8
    if ((name.charAt(i) == '<') || (name.charAt(i) == '>') ||
    (name.charAt(i) == '\"') || (name.charAt(i) == '&') ||
    (name.charAt(i) == '=') || (name.charAt(i) == '\\') ||
    (name.charAt(i) == '%') || (name.charAt(i) == '\\\\') ||
    (name.charAt(i) == '/') || (name.charAt(i) == ';')) {
        return false
    }
    if ((name.charCodeAt(i) < 33) || (name.charCodeAt(i) > 128)) {
        objClass.folderName = objClass.folderName + ";;"
        + name.charCodeAt(i)
+ ";;";
    } else {
        objClass.folderName = objClass.folderName + name.charAt(i);
    }
}
return true;
}
int decodeFolder(wchar_t *foldername,wchar_t *decodeName) {
    wchar_t temp[1000];
    long lLength = 0;
    int iValue = 0;
    int size = 0;
    try {
        decodeName[0] = L'\0';
        wchar_t *pDest = wcsstr(foldername,L";;");
        while(pDest != NULL) {
            lLength = pDest − (foldername + size);
            wcsncpy(temp,foldername + size,lLength);
            temp[lLength] = L'\0';
            wcscat(decodeName,temp);
            size = size + lLength + 2;
            pDest = wcsstr(foldername + size,L";;");
            if(pDest != NULL) {
                lLength = pDest − (foldername + size);
                wcsncpy(temp,foldename + size,lLength);
                temp[lLength] = 0;
                iValue = wcstol(temp,L'\0',0);
                swprintf(temp,1000,L"%1c",(wchar_t)iValue);
                wcscat(decodeName,temp);
                size = size + lLength + 2;
            }
            pDest = wcsstr(foldername + size,L";;");
        }
        wcscat(decodeName,foldername + size);
    } catch(...) {
        return −1;
    }
    return 1;
}
```

Although the preferred embodiment has been described in detail, it should be understood that various changes, substitutions, and alterations can be made therein without departing from the spirit and scope of the invention as defined by the appended claims.

What is claimed is:

1. A system for preserving digitally encoding character information in remote document folders completed via web browsing session between servers and browsers having different character sets via a processor running under instructions stored in a memory comprising:
    a character set defining legal characteristics usable in connection with folder naming;
    an input for receiving a digital sequence representative of a plurality associated characters associated with a filename of an electronic document folder corresponding to electronic document data associated with a web server;
    means for determining whether the digital sequence utilizes a seven bit sequence to represent an associated character of the filename;
    means for outputting an output signal representative if the digital sequence is other than seven bits in length;
    means for outputting a multi-byte character representation of each associated character in accordance with an output signal;
    means for encapsulating each multi-byte character representation in a web-compatible file format in accordance with a generated output signal, which encapsulated multi-byte character representation is encapsulated in accordance with a character outside of the character set
    means for associating a string of encapsulated multi-byte character representations with a file storage area associated with the electronic document folder;
    means for accessing electronic documents associated with the file storage area in accordance with the string of multi-byte characters;
    means adapted for sensing a web-browser based request for access to the file storage area of the electronic document folder; and
    means adapted for selectively generating the filename on the web browser in accordance with the string of encapsulated multi-byte characters in accordance with an output of the sensing means.

2. The system according to claim 1 further comprising means to convert an eight bit sequence into a plurality of seven bit sequences if the testing means determines that the digital sequence is an eight bit sequence.

3. The system according to claim 1 wherein the encapsulated multi-byte characters comprise an escape code comprised of at least one illegal character.

4. The system according to claim 1 wherein the encapsulated multi-byte characters comprise a sequence of two identical illegal characters.

5. The system according to claim 1 wherein the encapsulated multi-byte characters do not contain any special characters associated with a web server.

6. The method according to claim 1 wherein the encapsulated multi-byte characters do not contain any special characters associated with a web server.

7. A method for preserving digitally encoding character information in remote document folders completed via web browsing sessions between servers and browsers having differing character sets via processor running under instructions stored in a memory comprising the steps of:
    generating a character set defining legal characters usable in connection with file folder naming;
    receiving a digital sequence representative of a plurality associated characters associated with a filename of an electronic document folder corresponding to electronic document data associated with a web server;
    determining whether the digital sequence utilizes a seven bit sequence to represent an associated character of the file name;
    outputting an output signal representative if the digital sequence is other than seven bits in length;
    outputting a multi-byte character representation of each associated character in accordance with the output signal;
    encapsulating each multi-byte character representation in a web-compatible file format in accordance with a generated output signal, which encapsulated multi-byte character representation is encapsulated in accordance with a character outside of the character set;

associating a string of encapsulated multi-byte character representations with a file storage area associated with the electronic document folder;

accessing electronic documents associated with the file storage area in accordance with the string of multi-byte characters;

sensing a web-browser based request for access to the file storage area of the electronic document folder; and selectively generating the filename on the web browser in accordance with the string of encapsulated multi-byte characters in accordance with an output of the sensing step.

8. The method according to claim 7 further comprising the step of converting an eight bit sequence into a plurality of seven bit sequences if the digital sequence is an eight bit sequence.

9. The method according to claim 7 wherein the encapsulated multi-byte characters comprise an escape code comprised of at least one illegal character.

10. The method according to claim 7 wherein the encapsulated multi-byte characters comprise a sequence of two identical illegal characters.

11. A computer-implemented method for preserving digitally encoding character information in remote document folders completed via web browser sessions between servers and browsers having differing character sets via a processor running under instructions stored in a memory comprising:

generating a character set defining legal characters usable in connection with file folder naming;

receiving a digital sequence representative of a plurality of associated characters associated with a filename of an electronic document folder corresponding to electronic document data associated with a web server;

determining whether the digital sequence utilizes a seven bit sequence to represent the associated character of the filename;

outputting an output signal representative if the digital sequence is other than seven bits in length;

outputting a multi-byte character representation of each associated character in accordance with the output signal;

encapsulating each multi-byte character representation in a web-compatible file format in accordance with a generated output signal, which encapsulated multi-byte character representation is encapsulated in accordance with a character outside of the character set;

associating a string of multi-byte character representations with a file storage area associated with the electronic document folder;

accessing electronic documents associated with the file storage area in accordance with the string of multi-byte characters;

sensing a web-browser based request for access to the file storage area of the electronic document folder; and selectively generating the filename on the web browser in accordance with the string of encapsulated multi-byte characters in accordance with an output of the sensing step.

12. The method according to claim 11 further comprising the step of converting an eight bit sequence into a plurality of seven bit sequences if the digital sequence is an eight bit sequence.

13. The method according to claim 11 wherein the encapsulated multi-byte characters comprise an escape code comprised of at least one illegal character.

* * * * *